(12) United States Patent
Oh et al.

(10) Patent No.: US 8,264,653 B2
(45) Date of Patent: Sep. 11, 2012

(54) IN-PLANE SWITCHING MODE LIQUID CRYSTAL DISPLAY DEVICE AND METHOD FOR FABRICATING THE SAME

(75) Inventors: Jae Young Oh, Seoul (KR); Dong Su Shin, Anyang-Si (KR); Jae Kyun Lee, Suwon-Si (KR); Joon Young Yang, Buchwon-Si (KR); Kum Mi Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/241,069

(22) Filed: Sep. 22, 2011

(65) Prior Publication Data

US 2012/0008082 A1 Jan. 12, 2012

Related U.S. Application Data

(62) Division of application No. 12/121,441, filed on May 15, 2008, now Pat. No. 8,125,603.

(30) Foreign Application Priority Data

May 17, 2007 (KR) .......................... 10-2007-048352
Aug. 9, 2007 (KR) .......................... 10-2007-080352

(51) Int. Cl.
*G02F 1/1343* (2006.01)
(52) U.S. Cl. ........................... 349/141; 349/139; 349/38
(58) Field of Classification Search .................. 349/141, 349/38, 43, 143, 139
See application file for complete search history.

(56) References Cited

U.S. PATENT DOCUMENTS

| | | | |
|---|---|---|---|
| 5,886,762 A | 3/1999 | Lee et al. | |
| 6,188,459 B1 | 2/2001 | Kim | |
| 6,449,027 B2 | 9/2002 | Lee et al. | |
| 6,680,772 B2 * | 1/2004 | Lee | 349/141 |
| 7,206,049 B2 | 4/2007 | Song | |
| 7,206,050 B2 | 4/2007 | Chae | |
| 2005/0099569 A1 | 5/2005 | Moon et al. | |
| 2005/0140903 A1 | 6/2005 | Park et al. | |

FOREIGN PATENT DOCUMENTS

CN 1637558 A 7/2005

* cited by examiner

*Primary Examiner* — Thoi Duong
(74) *Attorney, Agent, or Firm* — Birch, Stewart, Kolasch & Birch, LLP

(57) ABSTRACT

An in-plane switching mode LCD having a plurality of pixels arranged in a matrix includes a gate line formed on a lower substrate, a data line formed such that the data line intersect the gate line to define a pixel region, a TFT (Thin Film Transistor) formed at the intersection of the gate line and the data line, a pixel electrode connected to the TFT, a common electrode to generate a horizontal electric field with the pixel electrode, and a common line supplying common voltage to the common electrode, wherein the common line comprises a first common line formed parallel to the gate line, a second common line formed parallel to the date line in a side portion of the pixel region adjacent to the data line, and a third common line formed parallel to the gate line and disposed between a first row and a second row of the matrix.

6 Claims, 18 Drawing Sheets

IN-PLANE SWITCHING MODE LIQUID CRYSTAL DISPLAY DEVICE AND METHOD FOR FABRICATING THE SAME

This application is a Divisional of application Ser. No. 12/121,441 filed on May 15, 2008 now U.S. Pat. No. 8,125,603, which claims priority to Korean Application No. P2007-48352, filed on May 17, 2007 and Korean Application No. P2007-80352, filed on Aug. 9, 2007. The entire contents of all of the above applications are hereby incorporated by reference.

BACKGROUND OF THE INVENTION

1. Field of the Invention

The present invention relates to an in-plane switching (IPS) mode liquid crystal display (LCD) device, and more particularly, to an IPS mode LCD device and a fabrication method thereof having a high aperture ratio and improving a uniformity of common voltage distribution through all the display panel.

2. Discussion of the Related Art

With a development of an information-oriented society, needs for various flat panel displays improving defects of a conventional Cathode Ray Tube (CRT) such as heavy weight and large volume have increased.

To this, various flat panel displays such as Liquid Crystal Display (LCD) device, Organic Light Emitting Diode (OLED), Plasma Display Panel (PDP) Device, and Surface-conduction Electron-emitter Display (SED) Device have lately attracted attention.

Especially, an LCD device is representative one of them applied to a large-sized TV screen through a small-sized mobile phone screen.

Generally, LCD device uses an optical anisotropic property and polarization properties of liquid crystal (LC) molecules to display images. The LC molecules have orientation characteristics resulted from their thin and long shape. Accordingly, the arrangement of liquid crystal molecules, and their directions may be controlled by applying an electrical field to them.

Therefore, when the electrical field is applied to the LC molecules, the polarization properties of light are changed based on the arrangement of the LC molecules, which enables an LCD device to display images. According to a direction of electric field driving LC molecules, the LCD device is classified into a vertical electric field type LCD and a horizontal electric field type LCD.

In the vertical electric field type LCD, for example Twisted Nematic (TN) mode, LC molecules are driven by vertical electric field generated between a common electrode and a pixel electrode, because the common electrode is formed on an upper substrate and the pixel electrode is formed on a lower substrate. The vertical electric field type LCD has a large aperture ratio, but it has a defect of a narrow viewing angle of about 90°.

In the horizontal electric field type LCD, for example In-Plane Switching (IPS) mode, LC molecules are driven by horizontal electric field generated between a common electrode and a pixel electrode, because the common electrode and the pixel electrode are formed on the same substrate. The horizontal electric field type LCD has a wider viewing angle of 160° than the vertical electric field type LCD.

Hereinafter, a conventional in-plane switching mode LCD will be explained more circumstantially. A conventional in-plane switching mode LCD comprises a lower substrate and an upper substrate located at a predetermined interval, a spacer to maintain a fixed cell gap between the two substrates, and liquid crystal interposed between the two substrates.

A thin film transistor array (TFT array) and an alignment film layer applied to the TFT array for alignment of liquid crystal are formed on the lower substrate. The thin film transistor array includes a gate line, a data line crossed the gate line to define a pixel region, a thin film transistor (TFT) formed adjacent to a crossing of the gate line and the data line, and a pixel electrode connected to the TFT.

A color filter array (CF array) and an alignment film layer applied to the CF array for alignment of liquid crystal to are formed on the upper substrate. The CF array includes a black matrix formed as a shape of a matrix to define a pixel region and to shield light, and a color filter formed at the pixel region.

FIG. 1 is a plain view of the conventional LCD. As shown in FIG. 1, a lower substrate 45 in the conventional LCD includes a gate line, a gate insulating film 44 formed to cover the gate line, a data line 4 formed on the gate insulating film crossing the gate line to define a pixel region, a TFT formed adjacent to a crossing of the gate line and the data line, a passivation layer 50 formed to cover the TFT, a pixel electrode 14 formed on the passivation layer to be connected with the TFT, a common electrode 18 to generate a horizontal electric field with the pixel electrode, and a common line 16 formed in the pixel region to supply common voltage to the common electrode.

Under the data line 4, a semiconductor pattern 48 comprising an active layer 15 and an ohmic contact layer 49 can be formed.

The upper substrate 65 includes a black matrix 66 formed as a shape of a matrix to define a pixel region and to shield light, and a color filter 67 formed at the pixel region.

FIG. 1 is a perspective view of a related art LCD device. As shown in FIG. 1, the prior art LCD device includes a first substrate 1a, a second substrate 1b, and a liquid crystal layer 3. At this time, the first and second substrates 1a and 1b are bonded to each other at a predetermined interval, and the liquid crystal layer 3 is formed between the first and second substrates 1a and 1b by injection of liquid crystal.

However, the conventional in-plane switching mode LCD has a problem of low aperture ratio caused by several patterns formed in the pixel region such as the pixel electrode, the common electrode, and a common line to supply common voltage to the common electrode.

Additionally, after-image may be generated because a distribution of common voltage level through an entire display panel is non-uniformed owing to the line resistance.

SUMMARY OF THE INVENTION

Accordingly, the present invention is directed to an in-plane switching mode LCD and method for fabricating the same that substantially obviates one or more problems due to limitations and disadvantages of the conventional in-plane switching mode LCD.

An advantage of the present invention is to provide an in-plane switching mode LCD device and method for fabricating the same that can increase aperture ratio and luminance.

Moreover, other advantage of the present invention is to provide an in-plane switching mode LCD device and method for fabricating the same that can uniform the common voltage level through the entire display panel and prevent the LCD from after-image.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of an embodiment of the present invention, an in-plane switching mode liquid crystal display device having a plurality of pixels arranged in a matrix includes a gate line formed on a lower substrate, a data line formed such that the data line intersect the gate line to define a pixel region, a TFT (Thin Film Transistor) formed at the intersection of the gate line and the data line, a pixel electrode connected to the TFT, a common electrode to generate a horizontal electric field with the pixel electrode, and a common line supplying common voltage to the common electrode, wherein the common line comprises a first common line formed parallel to the gate line in a lower portion of the pixel region, a second common line formed parallel to the date line in a side portion of the pixel region adjacent to the data line, and a third common line formed parallel to the gate line in a upper portion of the pixel region, and wherein the data line comprises a pair of sub-lines facing directly with each other in every two pixel regions.

To achieve these and advantages and in accordance with the purpose of other embodiment of the present invention, an in-plane switching mode liquid crystal display device having a plurality of pixels arranged in a matrix includes a gate line formed on a lower substrate, a data line formed such that the data line intersect the gate line to define a pixel region, a TFT (Thin Film Transistor) formed at the intersection of the gate line and the data line, a pixel electrode connected to the TFT, a common electrode to generate a horizontal electric field with the pixel electrode, and a common line supplying common voltage to the common electrode, wherein the pixel comprises a first sub-pixel, a second sub-pixel, a third sub-pixel and a fourth sub-pixel arranged in a 2 by 2 matrix, wherein the data line comprises a pair of sub-lines facing directly with each other in every two pixel regions, wherein the common line comprises a first common line formed parallel to the gate line, a second common line formed parallel to the date line in a side portion of the pixel region adjacent to the data line, and a third common line formed parallel to the gate line and disposed between a first row and a second row of the matrix, and wherein the sub-pixels of the first row and sub-pixels of the second row are symmetric with respect to the third common line.

To achieve these and advantages and in accordance with the purpose of another embodiment of the present invention, an in-plane switching mode liquid crystal display device having a plurality of pixels arranged in a matrix includes a gate line formed on a lower substrate, a data line formed such that the data line intersect the gate line to define a pixel region, a TFT (Thin Film Transistor) formed at the intersection of the gate line and the data line, a pixel electrode connected to the TFT, a common line parallel to the gate line and formed in an upper portion of the pixel region, a common electrode parallel to the pixel electrode such that the common electrode is branched from the common line and elongated to the pixel region, and a vertical common line formed parallel to the data line, wherein the data line comprises a pair of sub-lines facing directly with each other, and wherein the data line and the vertical common line are disposed alternatively between one pixel region.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Embodiment 1

Figure 2:
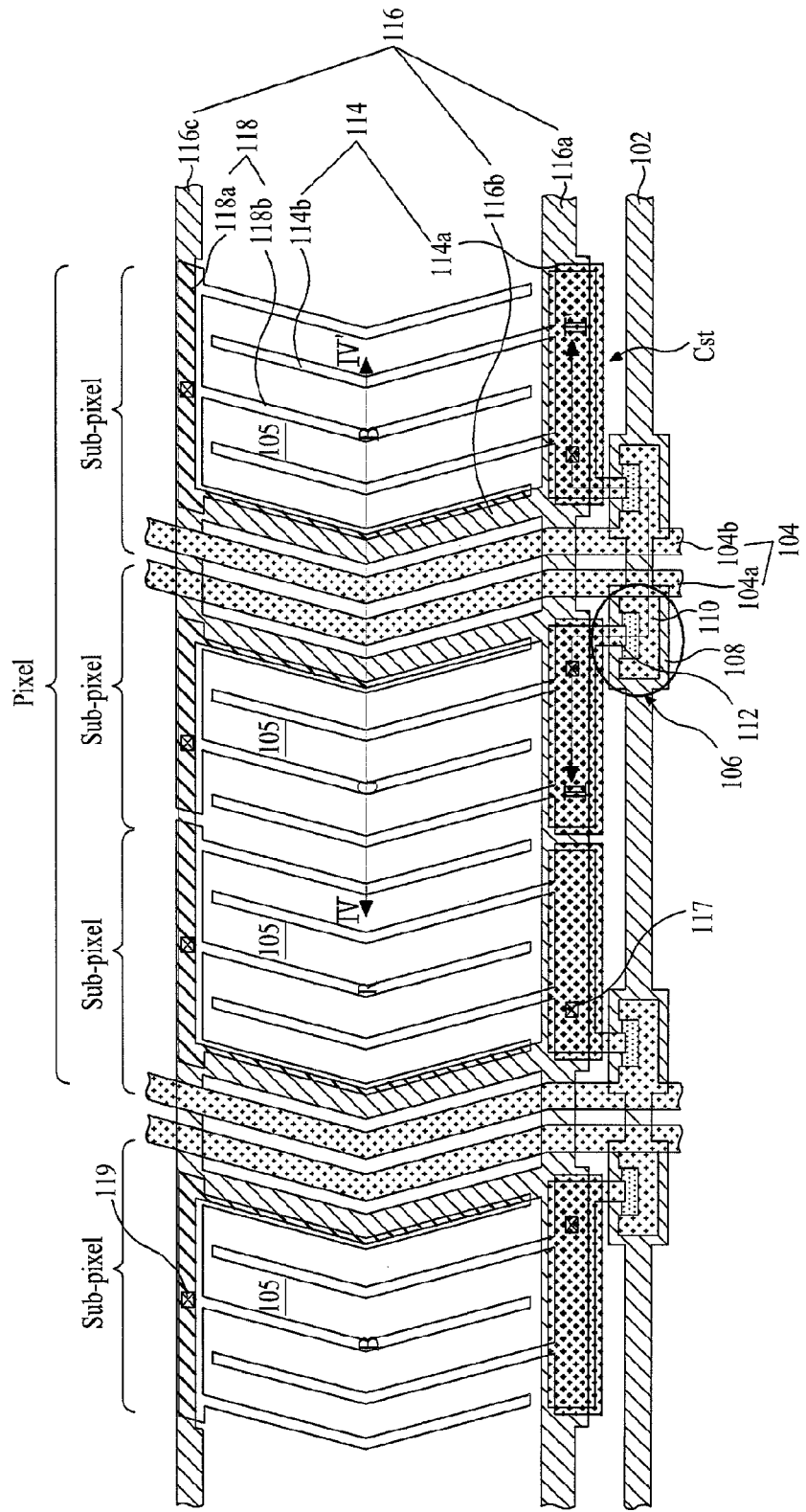
FIG. 2 is a schematic plane view of the in-plane switching liquid crystal display device according to the first embodiment of the present invention.
Figure 3:
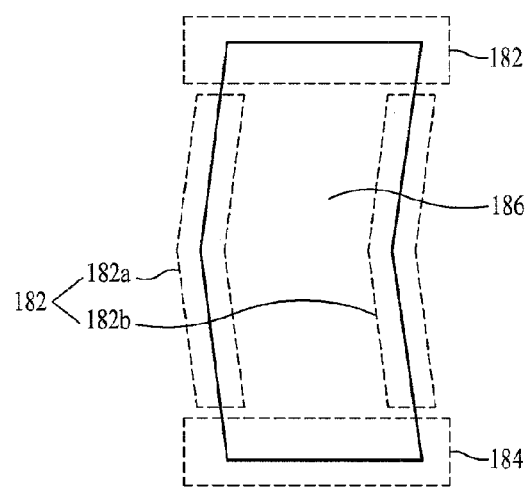
FIG. 3 shows an upper portion, a lower portion, a side portion and a central portion of a pixel region in the present invention.
Figure 4:
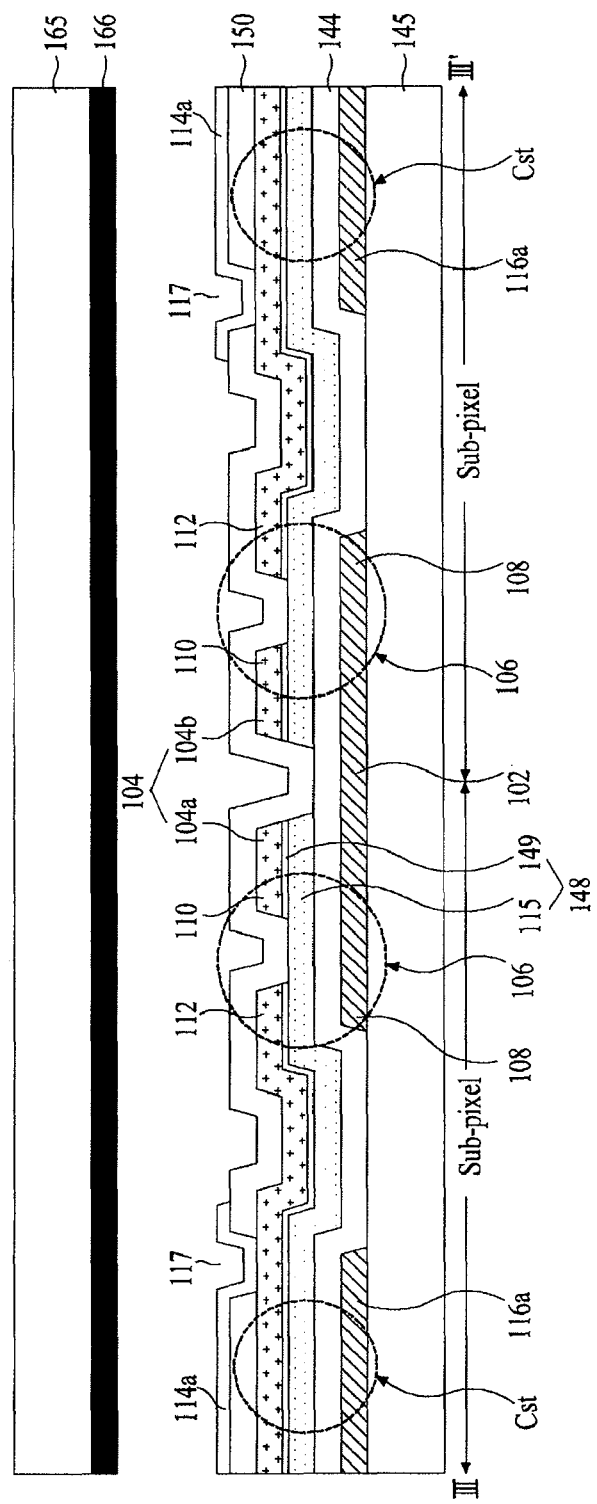
FIG. 4 and FIG. 5 are schematic cross-sectional view taken along lines "I-I'", "II-II'" of FIG. 2 respectively.
Figure 5:
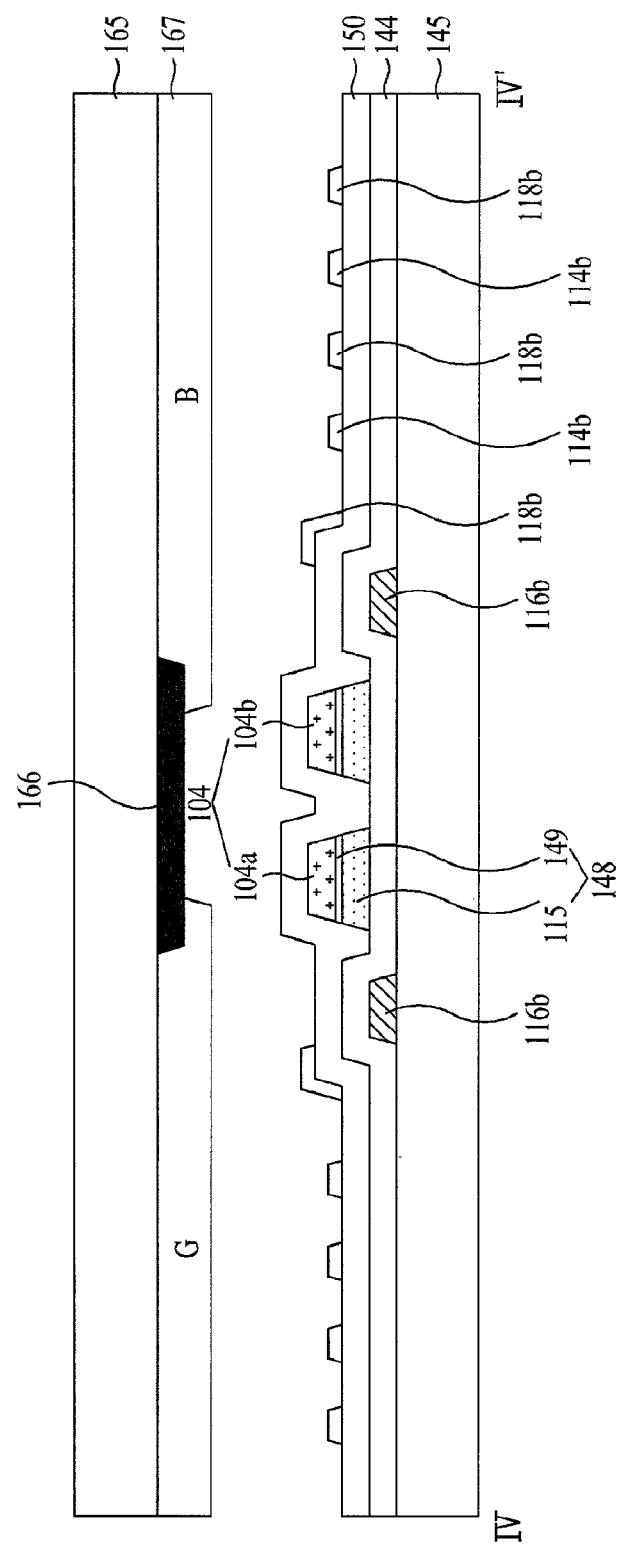

FIG. 2, FIG. 3, FIG. 4, and FIG. 5 shows in-plane switching liquid crystal display device according to a first embodiment of the present invention. FIG. 2 is a schematic plane view of the in-plane switching liquid crystal display device according to the first embodiment of the present invention. FIG. 3 shows an upper portion, a lower portion, a side portion and a central portion of a pixel region in the present invention. FIG. 4 and FIG. 5 are schematic cross-sectional view taken along lines "I-I'", "II-II'" of FIG. 2 respectively.

As shown in FIG. 2 to FIG. 5, in-plane switching mode liquid crystal display device includes a gate line 102 formed on a lower substrate 145, a data line 104 formed such that the data line 104 intersect the gate line 102 to define a pixel region 105, a TFT (Thin Film Transistor) 106 formed at the intersection of the gate line 102 and the data line 104, a pixel electrode 114 connected to the TFT 106, a common line 116 supplying common voltage, and a common electrode 118 to generate a horizontal electric field with the pixel electrode 114, wherein the data line comprises a pair of sub-lines 104a, 104b facing directly with each other in every two pixel regions.

The common line 116 comprises a first common line 116a formed parallel to the gate line 102 in a lower portion of the pixel region, a second common line 116b formed parallel to the date line 104 in a side portion of the pixel region, and a third common line 116c formed parallel to the gate line 102 in a upper portion of the pixel region. The second common line is only formed in the side portion adjacent to the data line.

As shown in FIG. 4, the TFT 106 includes a gate electrode 108 connected to the gate line 102, a gate insulator 144 covering the gate line 102 the common line 116, a semiconductor patter 148 on the gate insulator 144 including an active layer 115 and an ohmic contact layer 149, a source electrode 110 connected to the data line 104 on the one side of the semiconductor pattern 148, and a drain electrode 112 spaced apart from the source electrode 110 in opposition to the source electrode 110 on the semiconductor pattern 148.

The active layer 115 is exposed between the source and the drain electrodes and has a function of a channel between them. The ohmic contact layer 149 is interposed between the source/drain electrodes and the active layer 115 to make the active layer 115 ohmic-contacted to the source/drain electrodes. And a passivation film 150 covers the TFT 106 to protect the TFT.

The common line 116 supplies common voltage to the common electrode 118.

The gate line 102 supplies gate signal to the gate electrode 108, and the data line 104 supplies pixel signal to the pixel electrode 114 through the drain electrode 112 of the TFT 106.

The TFT 106 supplies the pixel signal to the pixel electrode 114 applied by data line 104.

The pixel electrode 114 comprises a first pixel electrode 114a parallel to the gate line 102 and connected to the TFT 106 through a first contact hole 117, and a plurality of second pixel electrodes 114b branched to the pixel region from the first pixel electrode 114a. In addition to, the pixel electrode has a portion partially overlapped with the common line 116 to function as a storage capacitor keeping pixel voltage charged to the pixel electrode 114 for a frame.

The common electrodes 118 comprises a first common electrode 118a connected to the third common line 116c through a second contact hole 119, and a plurality of second common electrodes 118b branched to the pixel region from the first common electrode 118a. Each of second common electrodes is arranged alternatively with each of second pixel electrodes.

The gate line 102 and common line 116 are formed in the same layer, and the pixel electrode 114 and common electrode 118 are formed in the same layer.

Additionally, sub-pixels arranged in the direction parallel to the gate line are able to share at least one of the first common line 116a and the third common line 116c. As shown in FIG. 2, the third common line 116c can also be shared in the only two sub-pixels arranged between two neighboring data lines.

And, in the first embodiment of the present invention, two pixel regions are disposed between two neighboring data lines. FIG. 2 shows that one pixel comprising a first sub-pixel of red color (R), a second sub-pixel of green color (G), and a third sub-pixel of blue color (B). As shown in FIG. 2, a data line comprising a pair of sub-lines is arranged between the second and third sub-pixels, and the data line is not arranged between the first and second sub-pixels. In addition to, although it is not shown in FIG. 2, a data line comprising a pair of sub-lines is arranged between the first and second sub-pixels, and the data line is not arranged between the second and third sub-pixels in an adjacent pixel to the pixel shown in FIG. 2.

As shown in FIG. 4 and FIG. 5, a black matrix 166 and a color filter 167 are formed on the upper substrate 165. The black matrix 166 is formed corresponding to the gate line 102, the data line 104, TFT 106, and the common line 116 to shield the transmission of light. The color filter 167 is also formed corresponding to the pixel region of each of sub-pixels.

As shown in FIG. 5, the data line 104 comprising a pair of sub-lines is disposed in every two sub-pixels.

For reference, FIG. 3 shows a pixel region comprising an upper portion 182, a side portion 184, a lower portion 186, and a central portion 188. The upper portion 182 is a part of the pixel region including an upper edge of the pixel region. The lower portion 186 is a part of the pixel region including a lower edge of the pixel region. The side portion 184 comprises a left side portion 184a and a right side portion 184b. The left and the right side portions are parts of the pixel region including a left edge and a right edge of the pixel region respectively. The central portion 188 is a remaining part of the pixel region except the upper portion, the lower portion, and a side portion. At this, each sub-line is connected to a closest thin film transistor.

As described above, in-plane switching mode liquid crystal display device according to the first embodiment of the present invention has an effect of increasing 4% of aperture ratio in comparison with the conventional in-plane switching mode liquid crystal display device, because two second common lines are disposed in the neighboring two sub-pixels for in-plane switching mode liquid crystal display device according to the present invention, while four second common lines are disposed for the conventional in-plane switching mode liquid crystal display device.

Next, referring to FIG. 6A to FIG. 6D, a method of fabricating a liquid crystal display device according to the first embodiment of the present invention will be explained. FIG. 6A, FIG. 6B, FIG. 6C, and FIG. 6D are process cross-sectional view of the first embodiment of the present invention.

Figure 6A:
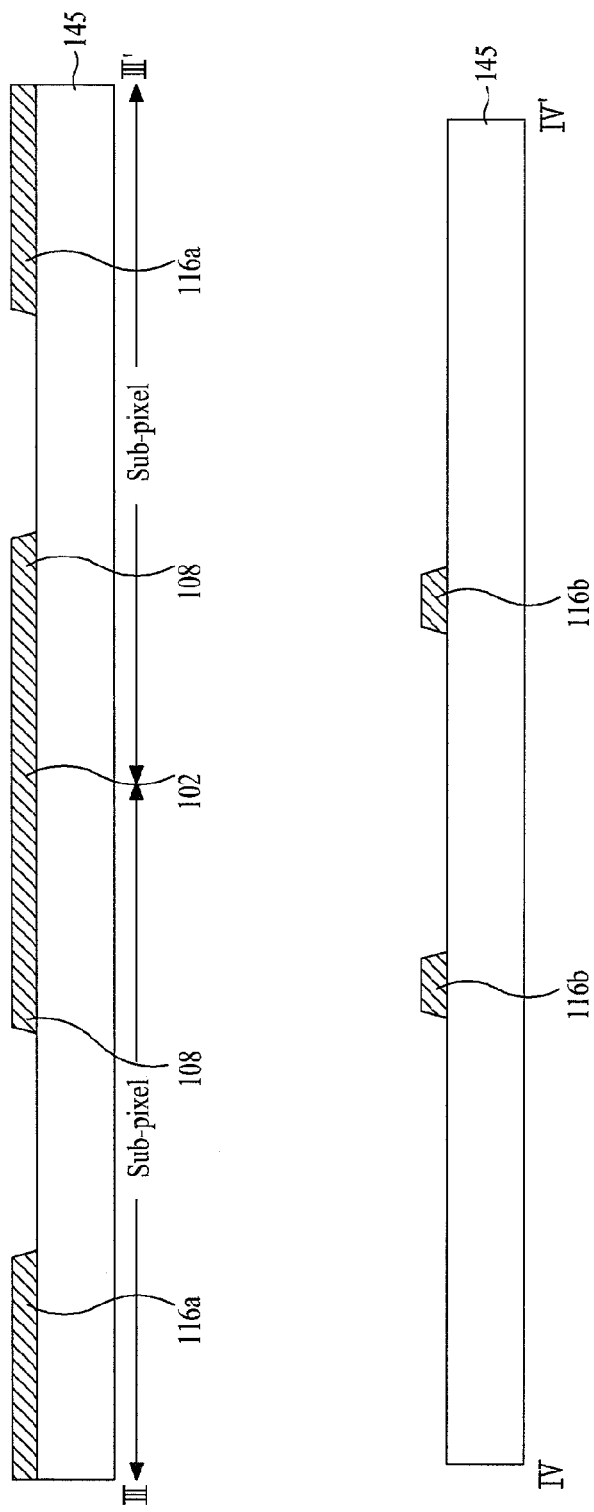
FIG. 6A, FIG. 6B, FIG. 6C, and FIG. 6D are process cross-sectional view of the first embodiment of the present invention.

First, as shown FIG. 6A, gate patterns are formed on the lower substrate 145.

In the concrete, a gate metal layer is deposited on the lower substrate 145 by a depositing method such as a sputtering method. Then, the gate patterns including a gate line 102, a gate electrode 108, and a common line 116 are formed by patterning the gate metal layer through a photolithography process and an etching process.

The common line 116 includes a first common line 116a and a second common line 116b. The first common line 116a is parallel to the gate line and is disposed in an upper portion of the pixel region.

The gate metal layer is formed of a metallic material, such as aluminum/neodymium (Al/Nd), aluminum (Al), copper (Cu), or titanium (Ti).

Then, an inorganic insulating material is deposited on an entire surface of the lower substrate including the gate patterns and a gate insulating layer 144 is formed. The gate insulating layer can be formed of an inorganic insulating material such as silicon nitride (SiNx) or silicon oxide (SiOx).

Figure 6B:
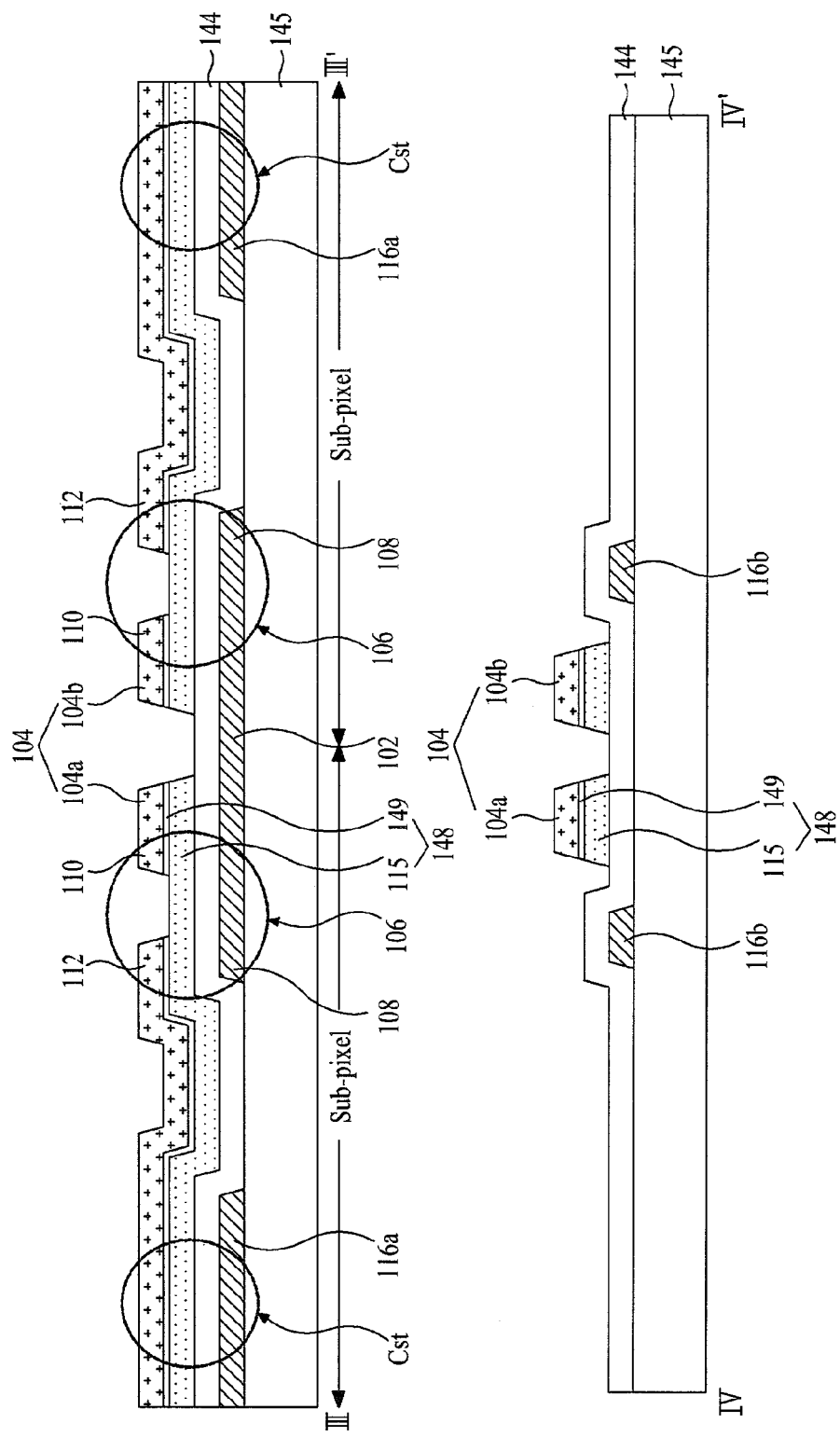

Then, shown in FIG. 6B, thin film transistor (TFT) 106 and a data line 104. Concretely, an amorphous silicon layer, a n+ amorphous silicon layer, and a source/drain metal layer are sequentially formed on the lower substrate 142 including the gate insulating layer 144 through depositing methods of a PECVD method and a sputtering method.

Then, a photoresist pattern is formed on the source/drain metal layer by a photolithography process using a photo mask. At this, a diffraction exposure mask or a half-tone mask can be used as a photo mask. The diffraction exposure mask has a slit region corresponding to the channel region of the thin film transistor. As the result of using a diffraction exposure mask or a half-tone mask, a photo resist pattern corresponding to the channel region of the thin film transistor has lower height that a photo resist pattern corresponding to the source/drain electrodes.

Then, source/drain patterns including a data line 104, a source electrode 110, a drain electrode 112 as one body with the source electrode 110, and a storage electrode 122 are formed by patterning the source/drain metal layer through a wet etching process using the photoresist pattern.

Then, a semiconductor pattern 148 comprising an ohmic contact layer 149 and an active layer 115 is formed by patterning the n+ amorphous silicon layer and the amorphous silicon layer at the same time through a dry etching process using the photoresist pattern.

Then, the source/drain metal layer and the ohmic contact layer 149 on a channel region are etched after an ashing process to removing a photoresist pattern having relatively lower height than other part on the channel region, and a data line 104 as well as a TFT 106 connected the data line is formed.

The data line 104 comprises a pair of sub-lines neighboring with each other. The sub-lines are directly facing and parallel with each other. TFTs 106 connected with the respective sub-lines are also disposed to face with each other with respect to the data line 104. As the source/drain metal layer, molybdenum (Mo), titanium (Ti), tantalum (Ta), or molybdenum alloy (Mo alloy) can be used.

Figure 6C:
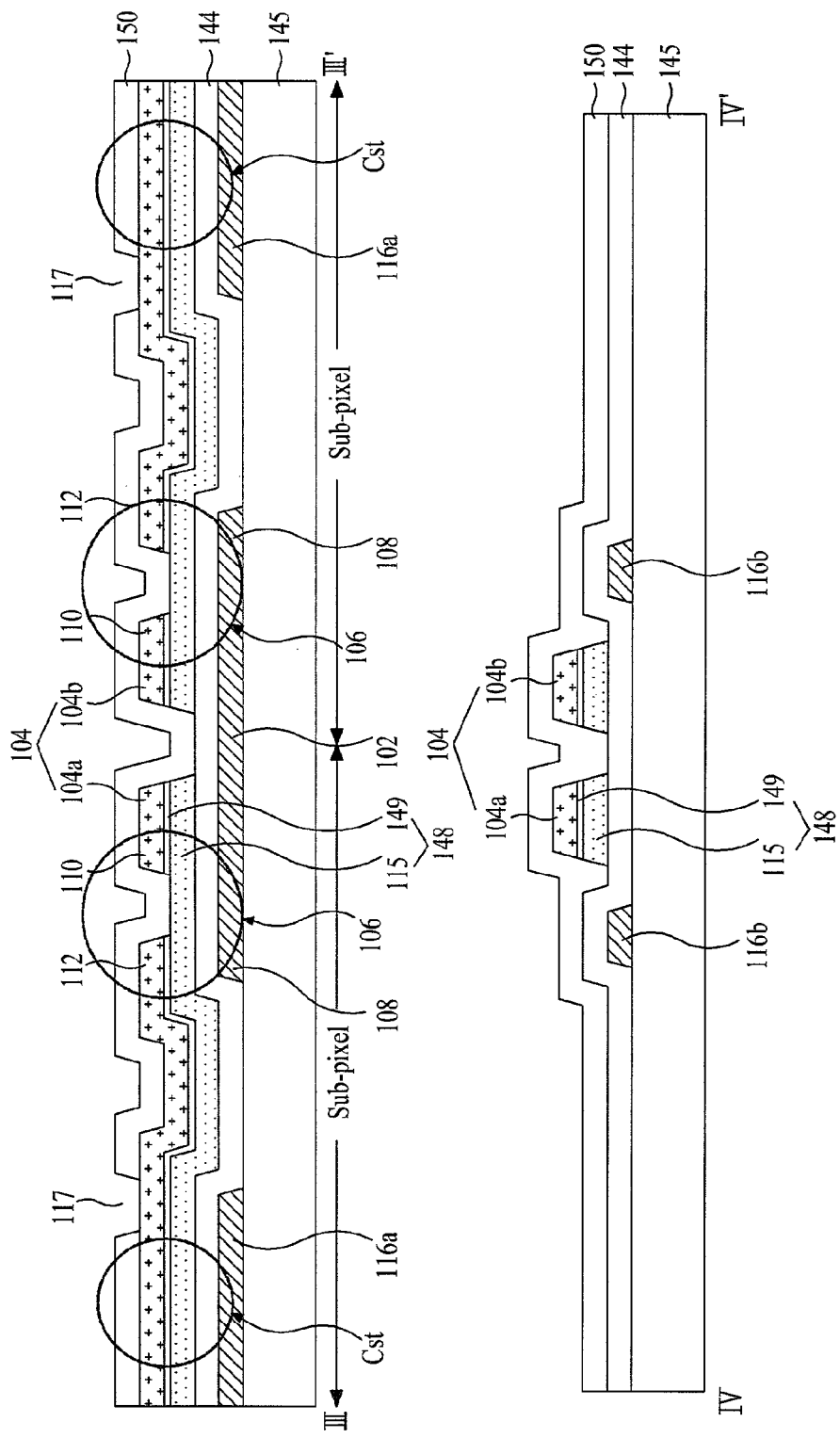

As shown FIG. 6c, a passivation layer 150 is formed on an surface of the lower substrate 145 including a TFT by further depositing an inorganic insulating material. The passivation layer 150 may be formed of an inorganic insulating material such as silicon nitride (SiNx) or silicon oxide (SiOx). After that, the passivation layer 150 is patterned to form a first contact hole 117 and a second contact hole exposing respectively the drain electrode 112 connected to the TFT 106 and the third common line 116c by a photolithography process and an etching process.

Figure 6D:
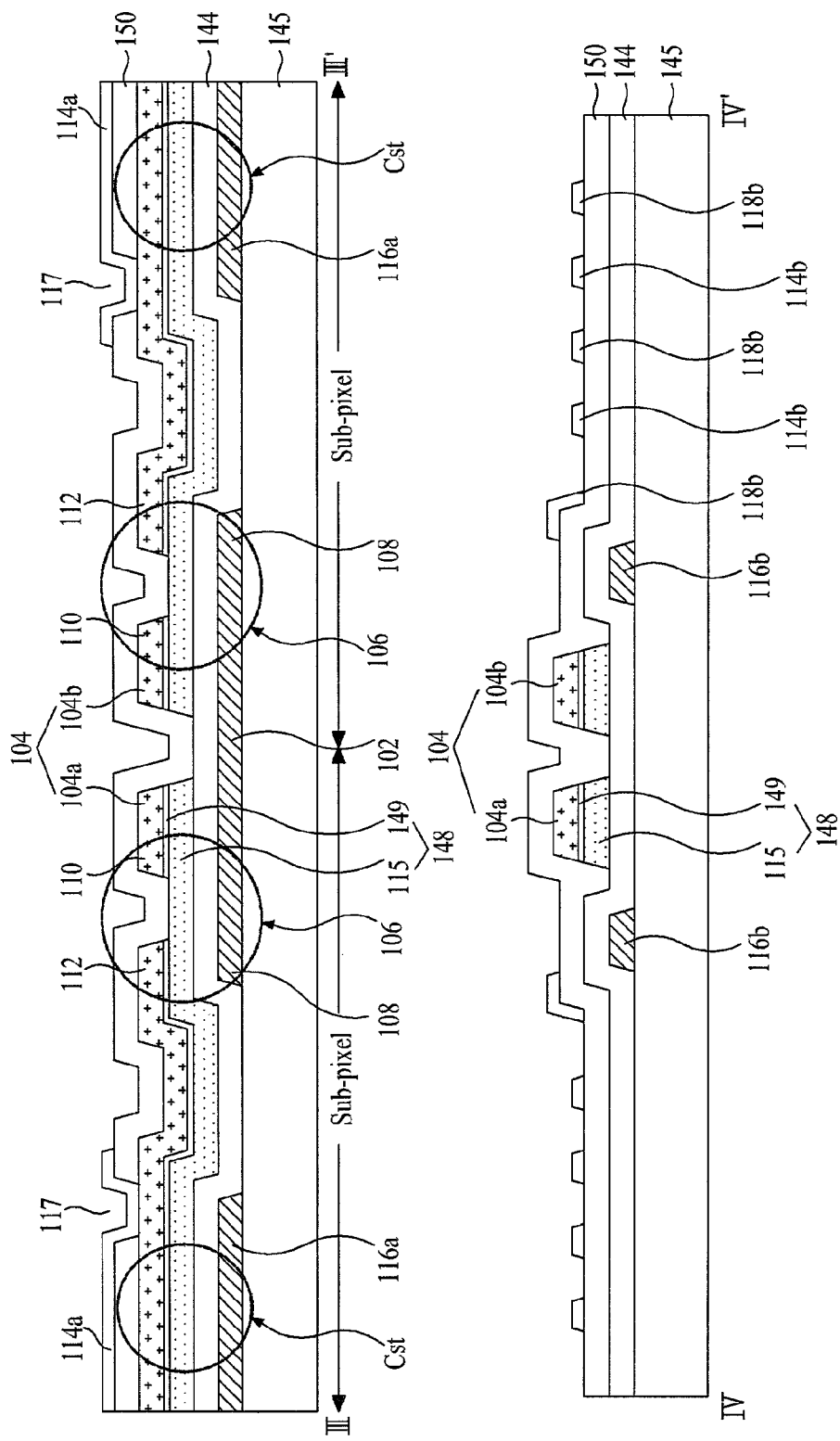

Next, as shown in FIG. 6d, a pixel electrode 114 and a common electrode 118 are formed on the passivation layer 150 formed the first contact hole 117 and the second contact hole 119 through a photolithography process and an etching process, after a transparent conducting material is deposited on the passivation layer 150 by a deposition method such as a sputtering method.

The pixel electrode 114 is formed to comprise a first pixel electrode 114a and a second pixel electrode 114b. The first pixel electrode is parallel to the gate line 102 and is connected to the drain electrode 112 through the first contact hole 117. The second pixel electrode is branched from the first pixel electrode and is elongated to the pixel region.

The common line 118 is formed to comprise a first common electrode 118a and a second common electrode 118b. The first common electrode is partially overlapped with the third common line 116c and is connected to the third common line 116c through the second contact hole 119. The second common electrode 118b is formed in parallel to the second pixel electrode 114b in the pixel region.

At this time, as the transparent conducting material, indium tin oxide (ITO), tin oxide (TO), indium zinc oxide (IZO), or indium tin zinc oxide (ITZO) can be used.

Figure 7:
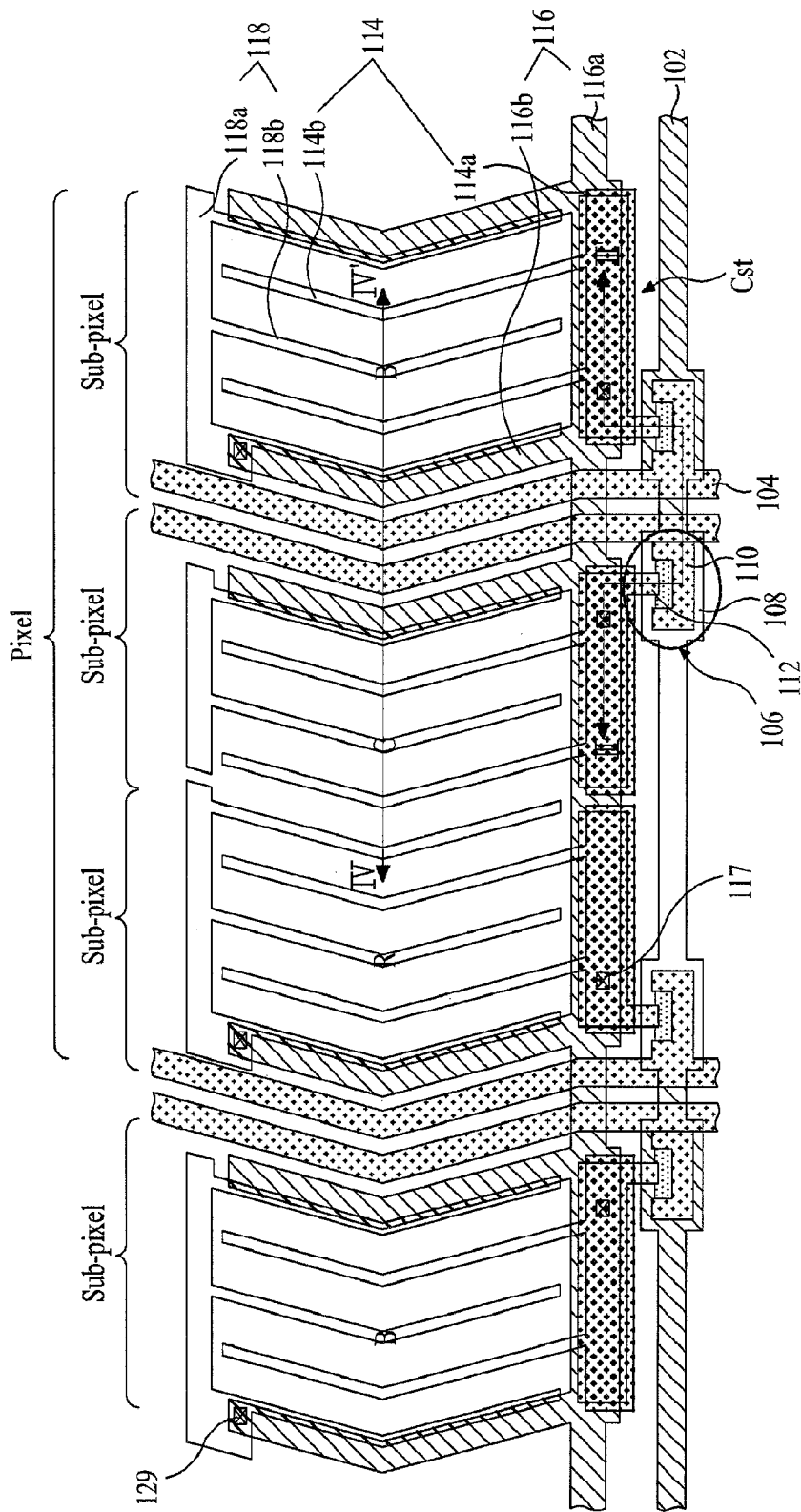
FIG. 7 is a plane view illustrating another structure according to the first embodiment of the in-plane mode liquid crystal display device.

FIG. 7 is a plane view illustrating another structure according to the first embodiment of the in-plane mode liquid crystal display device. As shown in FIG. 7, the third common line 116c disposed in the upper portion of the pixel region is removed among the first, the second, and the third common lines. And the common electrode 118 is connected to the second common line 116b through a third contact hole 129. As the result of that, aperture ratio can be increased to an extent of an area of the third common line 116c. With the exception of this, FIG. 7 shows the same structure of an in-plane switching mode liquid crystal display device that FIG. 2 shows.

Embodiment 2

Figure 8:
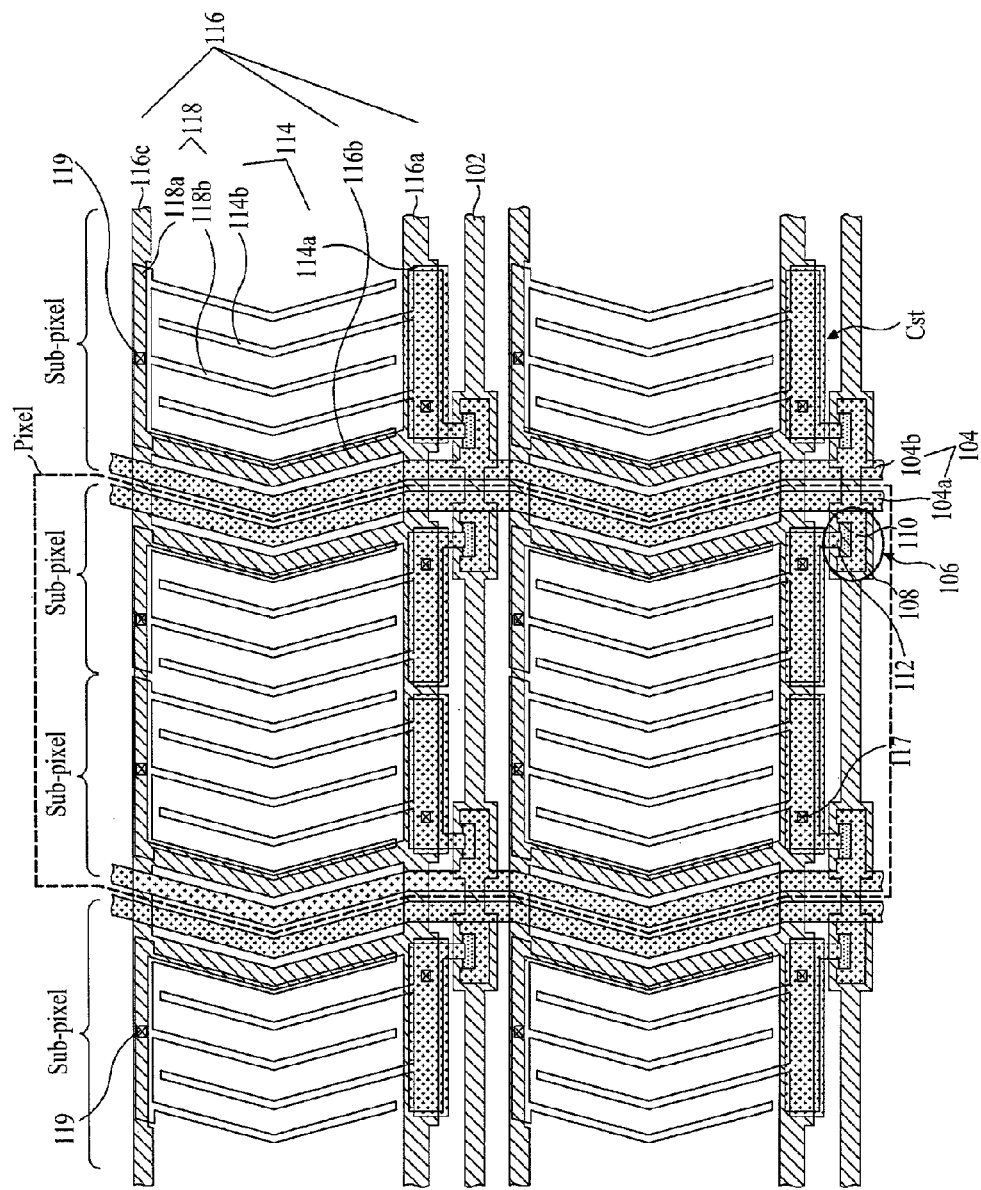
FIG. 8 is a plane view illustrating the in-plane switching mode liquid crystal display device according to the second embodiment of the present invention.

Referring to FIG. 8, the in-plane switching mode liquid crystal display device according to the second embodiment of the present invention will be explained. FIG. 8 is a plane view illustrating the in-plane switching mode liquid crystal display device according to the second embodiment of the present invention.

As shown in FIG. 8, the in-plane switching mode liquid crystal display device according to the second embodiment of the present invention has a similar structure to the in-plane switching mode liquid crystal display device according to the first embodiment of the present invention excepting that one pixel comprises four sub-pixels. Therefore, in FIG. 8, the same reference number will be assigned to the same elements with FIG. 2 to FIG. 5, and same as or similar to those mentioned above will not be described herein.

Referring to the FIG. 8, in the in-plane switching mode liquid crystal display device according to the second embodiment of the present invention, one pixel comprises four sub-pixels of a red sub-pixel (R), a green sub-pixel (G), a blue sub-pixel (b), and a white sub-pixel (W). Accordingly, one pixel can display one specific color by mixing the four colors.

That is, one pixel is defined as four sub-pixels arranged in a 2 by 2 matrix in the in-plane switching mode LCD according to the second embodiment of the present invention. The second common line 118b and a data line 104 comprising two sub-lines are not disposed between the neighboring two sub-pixels in one pixel, and are disposed between the two neighboring two pixels. As the result of that, the in-plane switching mode liquid crystal display device according to the second embodiment of the present invention has effects of increasing aperture ratio and of increasing color reproduction by minimizing a distance between neighboring sub-pixels in one pixel.

A method of fabricating the in-plane switching mode liquid crystal display device according to the second embodiment of the present invention is similar to the method of fabricating the in-plane switching mode liquid crystal display device according to the first embodiment of the present invention excepting that one pixel comprises four sub-pixels displaying different colors respectively and that two of second common lines 116b as well as a data line 104 comprising two sub-lines are disposed between neighboring two pixels.

In other words, the method of fabricating the in-plane switching mode liquid crystal display device according to the second embodiment of the present invention has a first mask process to form gate patterns, a second mask process to form a data line 104 and a TFT 106, a third mask process to form a passivation layer 150 and contact holes, and a fourth mask process to form a common electrode 118 and a pixel electrode 114 similar to the method of fabricating the in-plane switching mode liquid crystal display device according to the first embodiment of the present invention.

However, in the second embodiment of the present invention, two of second common lines 116b are disposed between two neighboring pixels contrary to the first embodiment of the present invention, and a data line comprising a pair of sub-lines is formed between the two of second common lines.

There is no second common line 116b and a data line 104 between two neighboring sub-pixels in one pixel.

Detailed explanations in connection with other elements in the second embodiment of the present invention will be omitted, because they are duplicated with explanations in connection with FIG. 6A to FIG. 6D.

Figure 9:
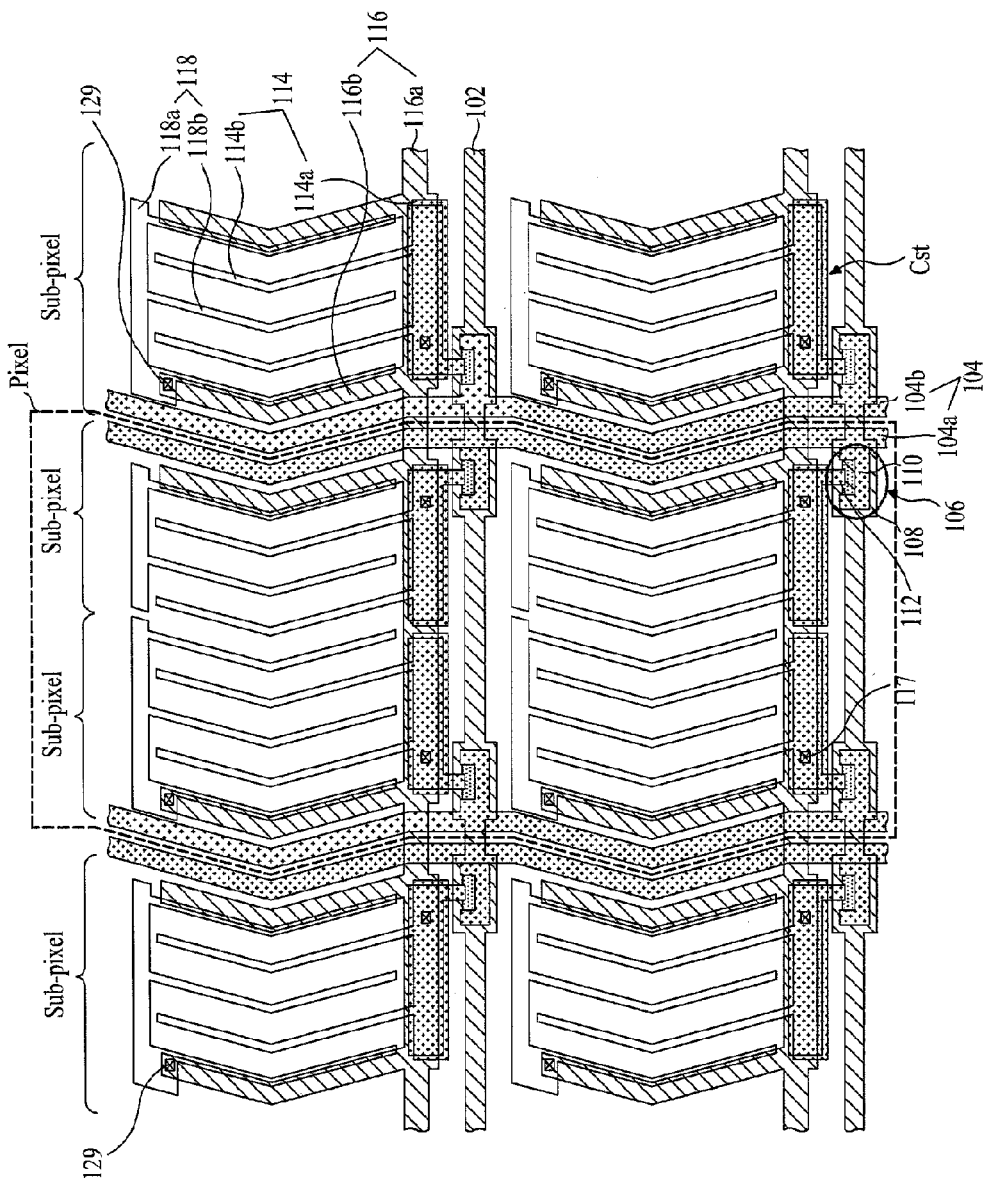
FIG. 9 is a plane view illustrating another structure according to the second embodiment of the in-plane mode liquid crystal display device.

FIG. 9 is a plane view illustrating another structure according to the second embodiment of the in-plane mode liquid crystal display device. As shown in FIG. 9, the third common line 116c disposed in the upper portion of the pixel region is removed among the first, the second, and the third common lines. And the common electrode 118 is connected to the second common line 116b through a third contact hole 129. As the result of that, aperture ratio can be increased to an extent of an area of the third common line 116c. With the exception of this, FIG. 9 shows the same structure of an in-plane switching mode liquid crystal display device that FIG. 2 shows.

Embodiment 3

Figure 10:
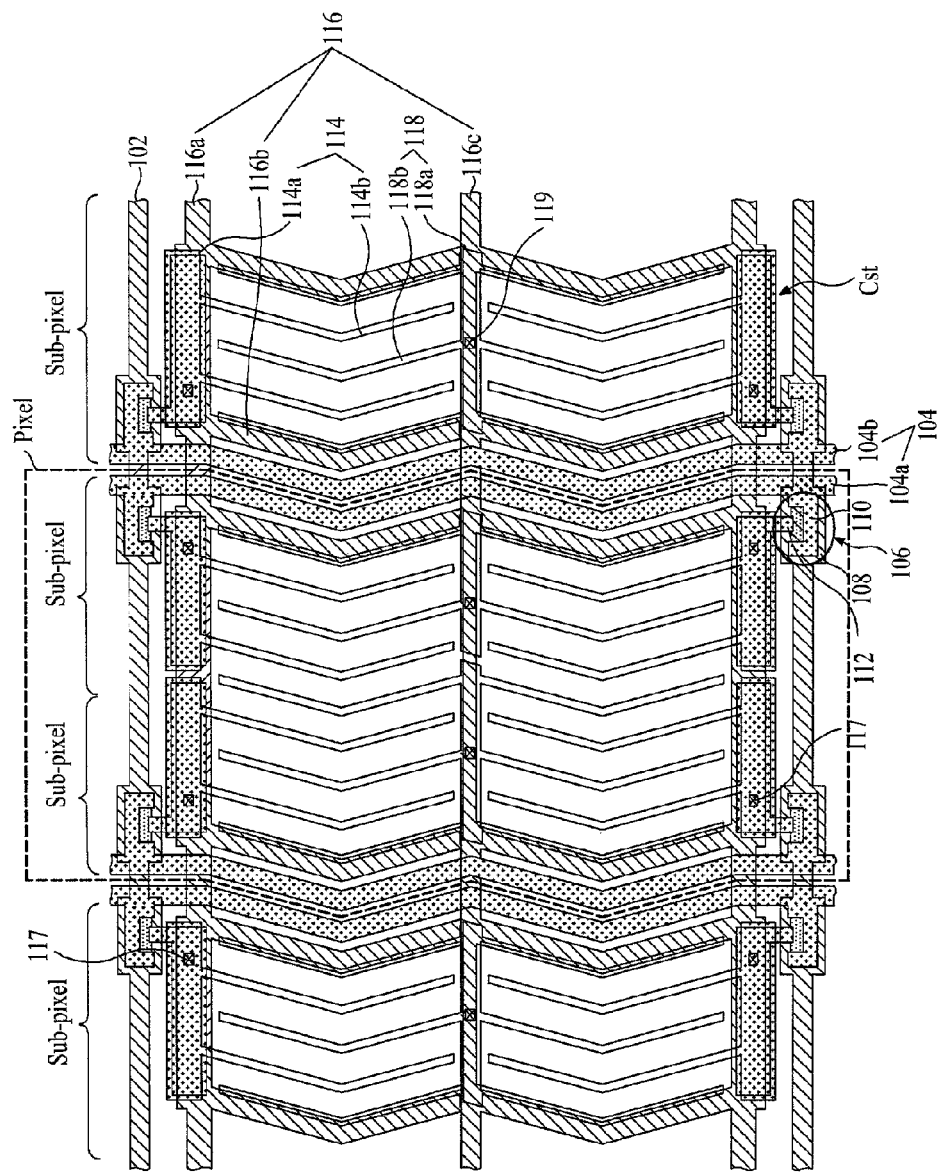
FIG. 10 is a plane view illustrating the in-plane switching mode liquid crystal display device according to the third embodiment of the present invention.

Referring to FIG. 10, the in-plane switching mode liquid crystal display device according to the third embodiment of the present invention will be explained. FIG. 10 is a plane view illustrating the in-plane switching mode liquid crystal display device according to the third embodiment of the present invention.

When comparing the third embodiment with the second embodiment of the present invention, neighboring sub-pixels in a vertical direction in one pixel share the third common line 116c and have symmetric structures with respect to the third common line.

Moreover, shown in FIG. 10, the respective first common electrodes 114a of neighboring sub-pixels in a horizontal direction in one pixel are connected to the first common line 116a through the second contact hole 119.

That is, in the third embodiment of the present invention, one pixel comprises four sub-pixels arranged in 2 by 2 matrix. The first common line 116a of sub-pixels in a first row is formed in the upper portion of the pixel region, and the first common line of sub-pixels in a second row is formed in the lower portion of the pixel region. Besides, sub-pixels in the first and the second rows share a third common line 116c.

As the result of that, a distance between vertically neighboring sub-pixels in one pixel will be shortened in comparison with the second embodiment of the present invention shown in FIG. 8, and the third embodiment has an effect of increasing more color reproduction than the second embodiment.

With the exception of this, the in-plane switching mode liquid crystal display device according to the third embodiment of the present invention has similar structure to the in-plane switching mode liquid crystal display device according to the first embodiment of the present invention shown in FIG. 2 to FIG. 5. Therefore, detailed explanations in connection with other elements in the third embodiment of the present invention will be omitted.

Embodiment 4

Figure 11:
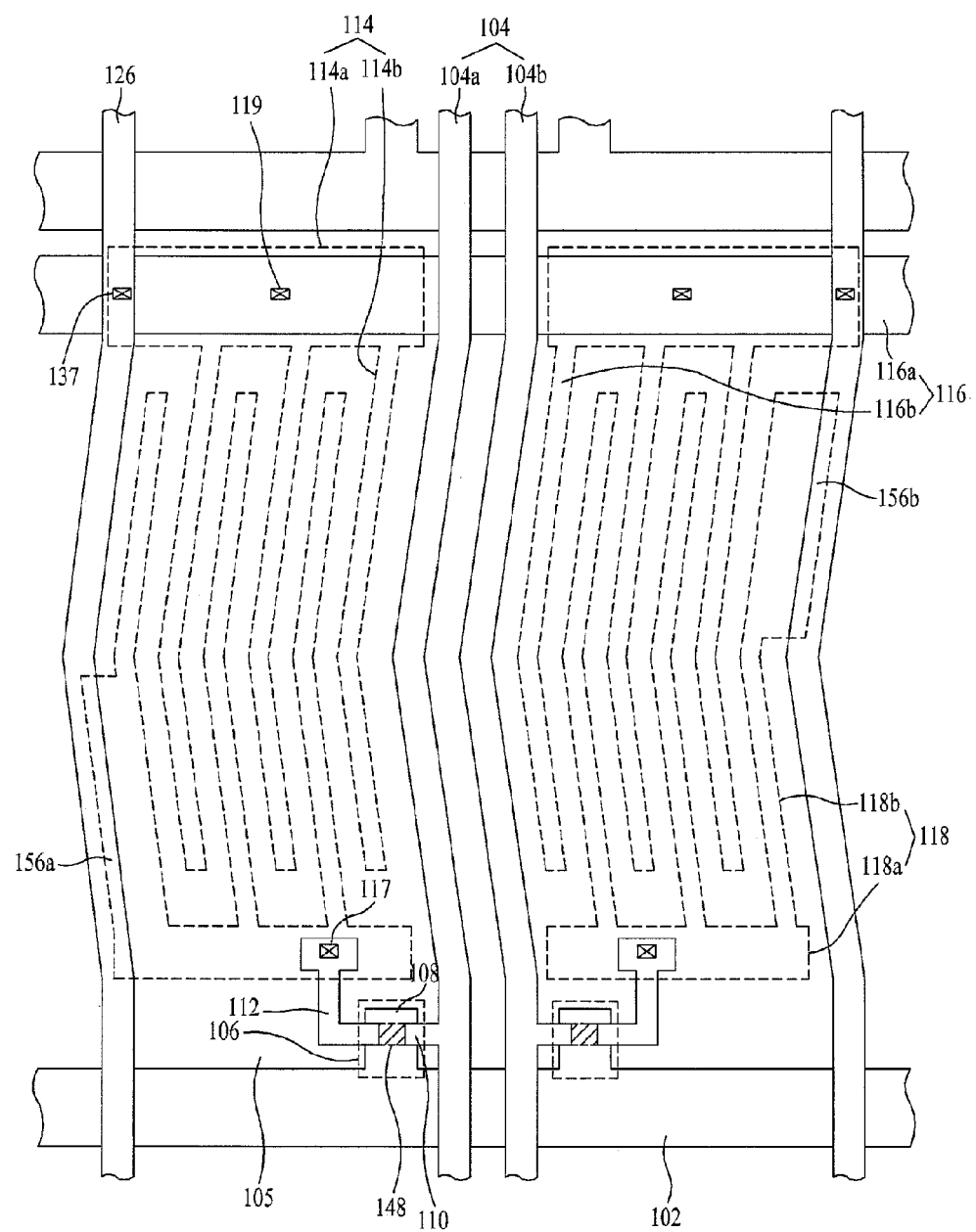
FIG. 11 is a plane view of the in-plane switching mode LCD according to the fourth embodiment of the present invention.

FIG. 11 is a plane view of the in-plane switching mode LCD according to the fourth embodiment of the present invention.

As shown in FIG. 11, the in-plane switching mode LCD according to the fourth embodiment of the present invention includes a gate line 102 formed on a lower substrate 145, a data line 104 formed such that the data line 104 intersect the gate line 102 to define a pixel region 105, a TFT 106 formed at the intersection of the gate line 102 and the data line 104, a pixel electrode 114 connected to the TFT 106, a common line 116 formed at an upper portion of the pixel region parallel to the gate line with supplying common voltage, and a vertical common line 126 formed parallel to the data line with supplying common voltage, wherein the data line comprises a pair of sub-lines facing directly with each other and is arranged alternatively with the vertical common line 126 at an interval of a sub-pixel.

That is, in the fourth embodiment of the present invention, common voltage is supplied by the common line 116 corresponding to the third common line in the first embodiment of the present invention and the vertical common line 126 formed parallel to the data line 104. And, sub-pixels arranged in a horizontal direction share the common line 116 and sub-pixels arranged in a vertical direction share the vertical common line 126.

The common line 116 is formed of a same layer with the gate line 102, and the vertical common line 126 is formed of a same layer with the data line 104.

Such as the first embodiment of the present invention, the TFT 106 includes a gate electrode 108 connected to the gate line 102, a gate insulator 144 covering the gate line 102 the common line 116, a semiconductor patter 148 on the gate insulator 144 including an active layer 115 and an ohmic contact layer 149, a source electrode 110 connected to the data line 104 on the one side of the semiconductor pattern 148, and a drain electrode 112 spaced apart from the source electrode 110 in opposition to the source electrode 110 on the semiconductor pattern 148.

The active layer 115 is exposed between the source and the drain electrodes and has a function of a channel between them. The ohmic contact layer 149 is interposed between the source/drain electrodes and the active layer 115 to make the active layer 115 ohmic-contacted to the source/drain electrodes. And a passivation film 150 covers the TFT 106 to protect the TFT.

The common line 116 supplies common voltage to the common electrode 118.

The gate line 102 supplies gate signal to the gate electrode 108, and the data line 104 supplies pixel signal to the pixel electrode 114 through the drain electrode 112 of the TFT 106.

The TFT 106 supplies the pixel signal to the pixel electrode 114 applied by data line 104.

The pixel electrode 114 comprises a first pixel electrode 114a parallel to the gate line 102 and connected to the TFT 106 through a first contact hole 117, and a plurality of second pixel electrodes 114b branched from the first pixel electrode 114a and elongated to the pixel region. In addition to, the fourth embodiments further includes a storage part elongated from the first pixel electrode 114a and partially overlapped with the vertical common line 126 is further formed. The storage part functions as a storage capacitor keeping pixel voltage charged to the pixel electrode 114 for a frame.

As shown in FIG. 11, the storage part comprises a first storage part 156a partially overlapped with a lower portion of the vertical common line 126 and a second storage part 156b partially overlapped with an upper portion of the vertical common line 126.

At this, the first storage part 156a is formed at one of two neighboring sub-pixels in the horizontal direction and the second storage part 156b is formed at the other of them. And, the first and the second storage part are arranged alternatively to keep the average of storage capacitor of the LCD fixed without an accuracy of alignment.

Figure 12:
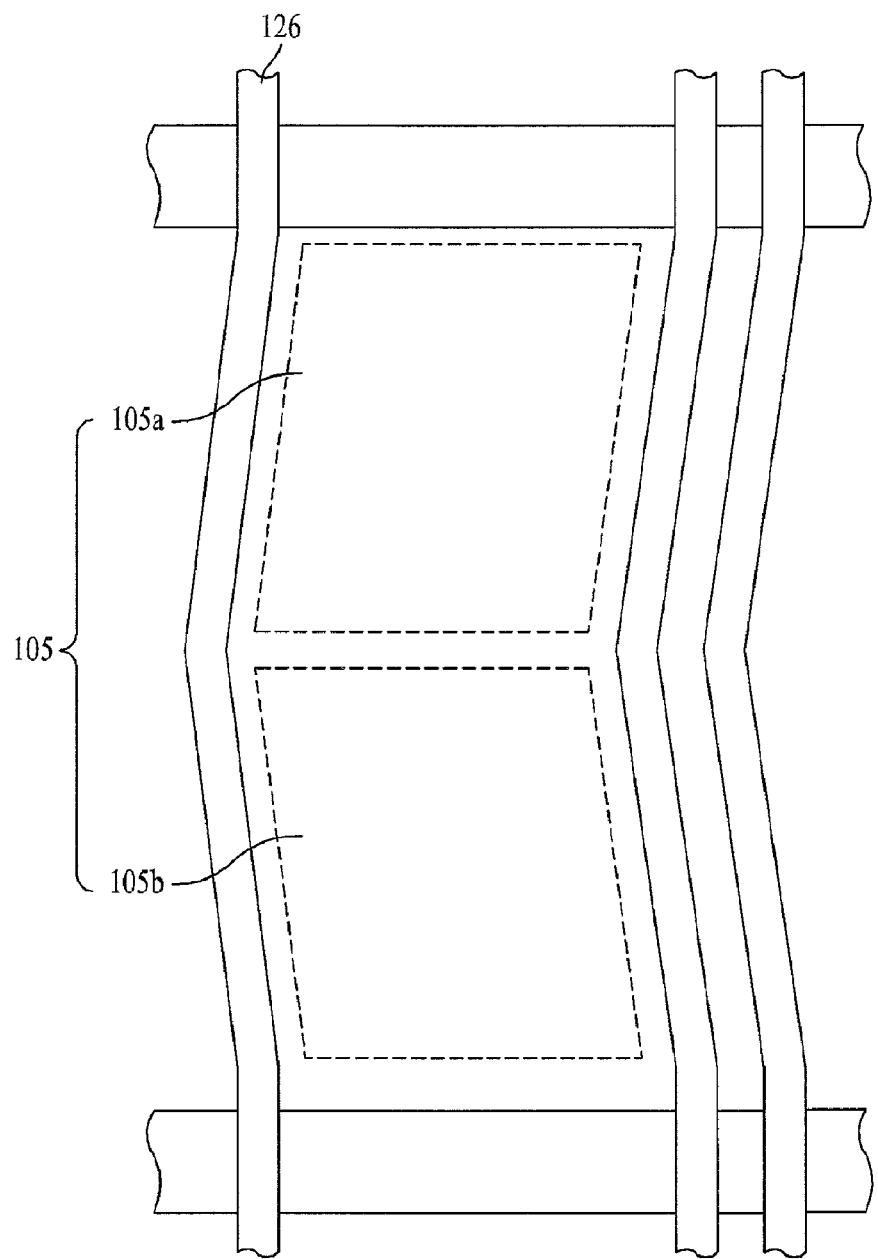
FIG. 12 shows an upper portion and a lower portion of the vertical common line in the present invention.

As shown in FIG. 12, the upper portion of the vertical common line 126 is a portion of vertical common line corresponding to a lower half portion of the pixel region, and the lower portion of the vertical common line 126 is a portion of vertical common line corresponding to an upper half portion of the pixel region.

The common electrodes 118 comprises a first common electrode 118a connected to the third common line 116c through a second contact hole 119, and a plurality of second common electrodes 118b branched to the pixel region from the first common electrode 118a. Each of second common electrodes is arranged alternatively with each of second pixel electrodes. Additionally, the first common electrode 118a is connected with the vertical common line 126 through a fourth contact hole 137. The vertical common line 126 is exposed through the fourth contact hole 137 formed by the removal of the passivation layer 150.

The pixel electrode 114 and common electrode 118 can be formed of the same layer such as a transparent conducting material or an opaque metal layer.

In addition to, the common line 116 and the vertical common line 126 can be connected electrically through the first common electrode 114a to have an effect of making a level of common voltage uniform through an entire liquid crystal display device.

Embodiment 5

Figure 13:
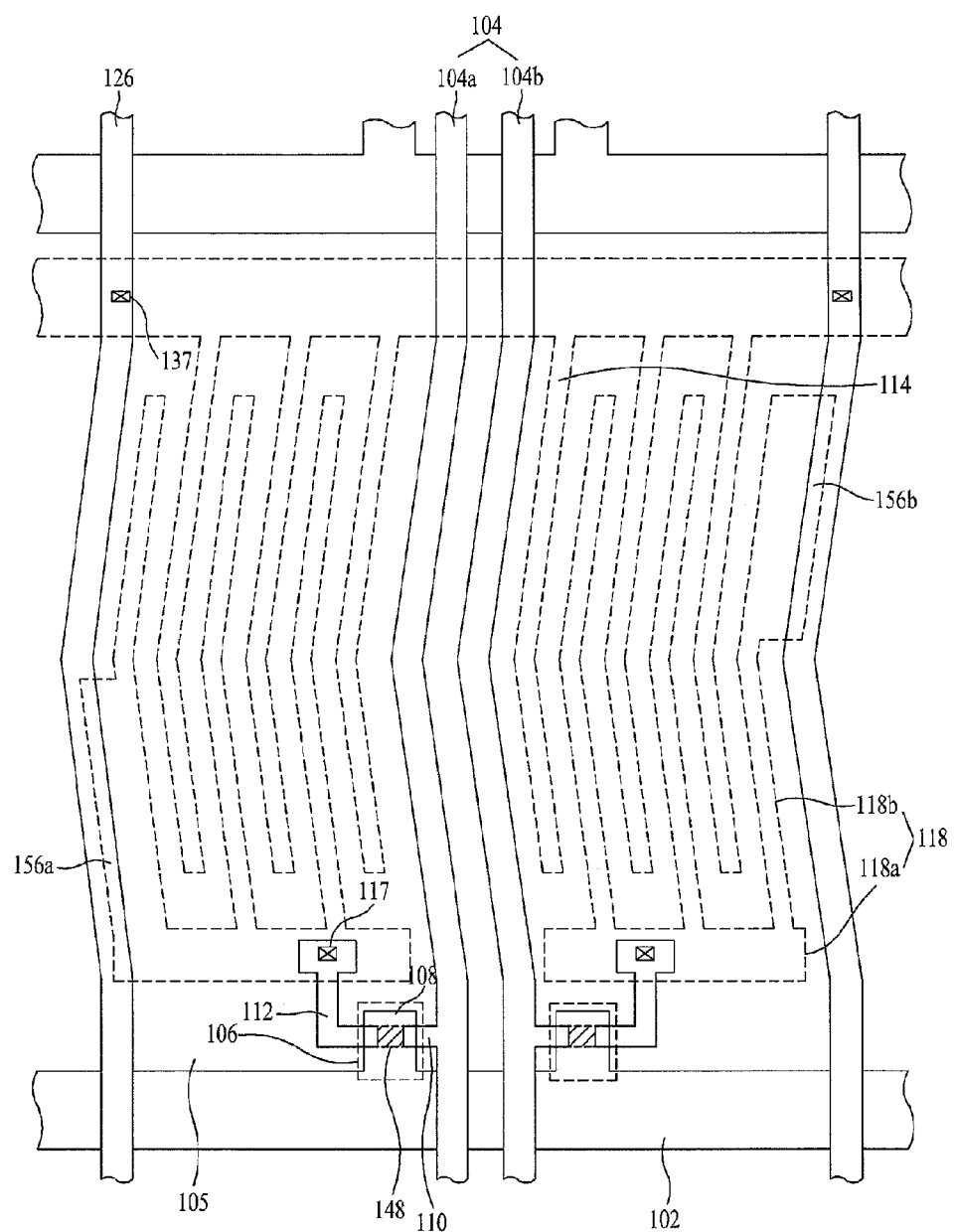
FIG. 13 is a plane view of the in-plane switching mode LCD according to the fifth embodiment of the present invention.

FIG. 13 is a plane view of the in-plane switching mode LCD according to the fifth embodiment of the present invention.

As shown in FIG. 13, the in-plane switching mode LCD according to the fourth embodiment of the present invention includes a gate line 102 formed on a lower substrate 145, a data line 104 formed such that the data line 104 intersect the gate line 102 to define a pixel region 105, a TFT 106 formed at the intersection of the gate line 102 and the data line 104, a pixel electrode 114 connected to the TFT 106, a common line 116 formed at an upper portion of the pixel region parallel to the gate line with supplying common voltage, and a vertical common line 126 formed parallel to the data line with supplying common voltage, wherein the data line comprises a pair of sub-lines facing directly with each other and is arranged alternatively with the vertical common line 126 at an interval of a sub-pixel, and wherein the common line 116 and the pixel electrode are formed of the same layer.

Additionally, in fifth embodiment of the present invention, the common electrode 114 is also formed of the same layer with the pixel electrode 118 such as a transparent material or an opaque metal layer. The common electrode is branched from the common line 116 and is elongated to the pixel region.

And, the common line 116 is connected electrically with the vertical common line 126 through the fourth contact hole 137 formed to expose the vertical common line.

With the exception of these, the in-plane switching mode liquid crystal display device according to the fifth embodiment of the present invention has similar structure to the in-plane switching mode liquid crystal display device according to the fourth embodiment of the present invention shown in FIG. 11 to FIG. 12. Therefore, detailed explanations in connection with other elements in the third embodiment of the present invention will be omitted.

Figure 14:
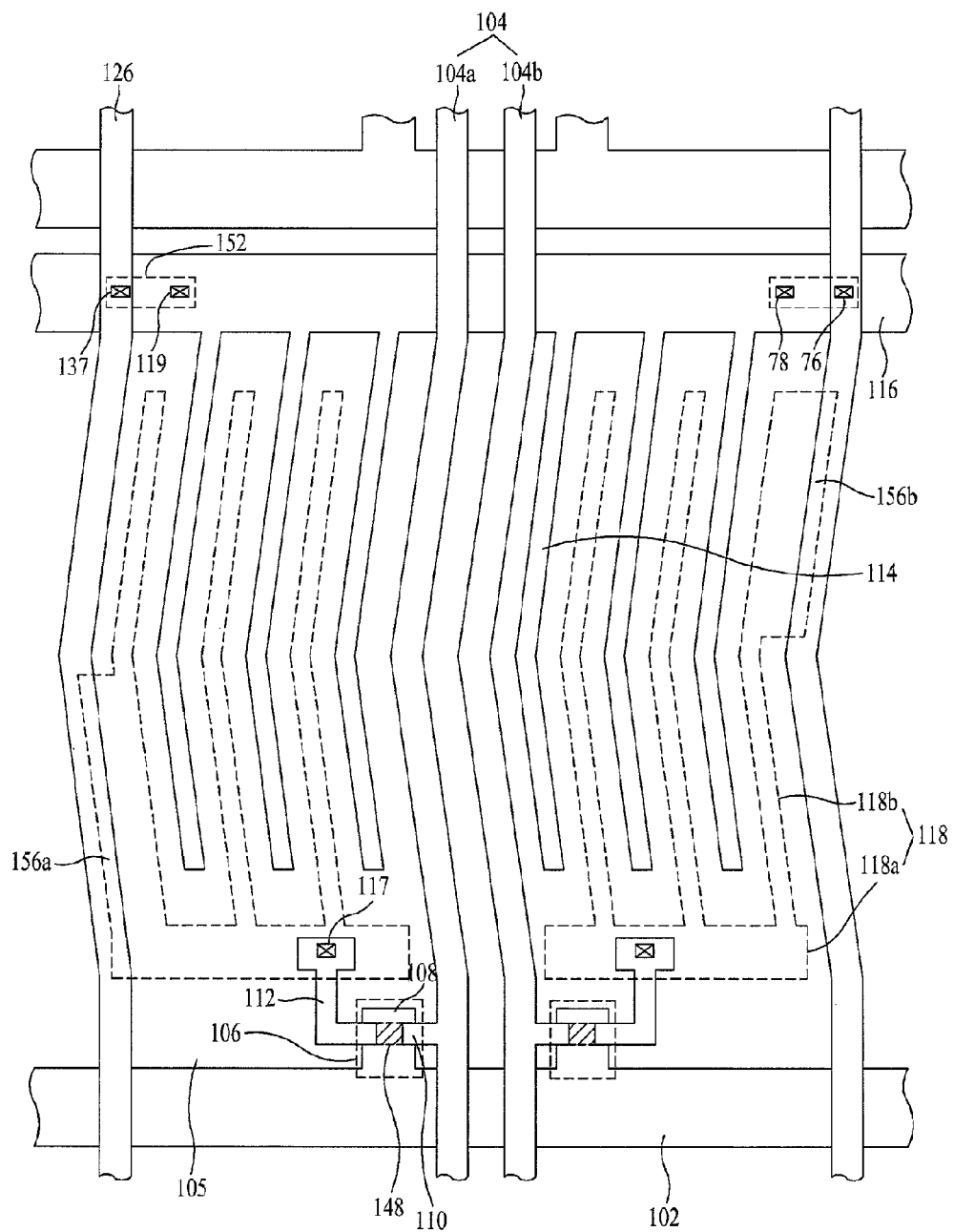
FIG. 14 is a plane view illustrating another structure according to the fifth embodiment of the in-plane mode liquid crystal display device.

FIG. 14 is a plane view illustrating another structure according to the fifth embodiment of the in-plane mode liquid crystal display device.

In FIG. 14, the common line 116 and the common electrode 114 are formed of the same layer. The common line 116 and the vertical common line 126 are connected electrically with each other by a connection pattern 152 covering the second contact hole 119 and the fourth contact hole 137 at the same time. The connection pattern is formed of the same layer with the pixel electrode 118 such as a transparent conducting material.

Like this, LCD shown in FIG. 14 has a similar structure to LCD shown in FIG. 12 except that the common line as well as the common electrode is formed of the same layer with the gate line and it includes further the connection pattern.

Figure 1:
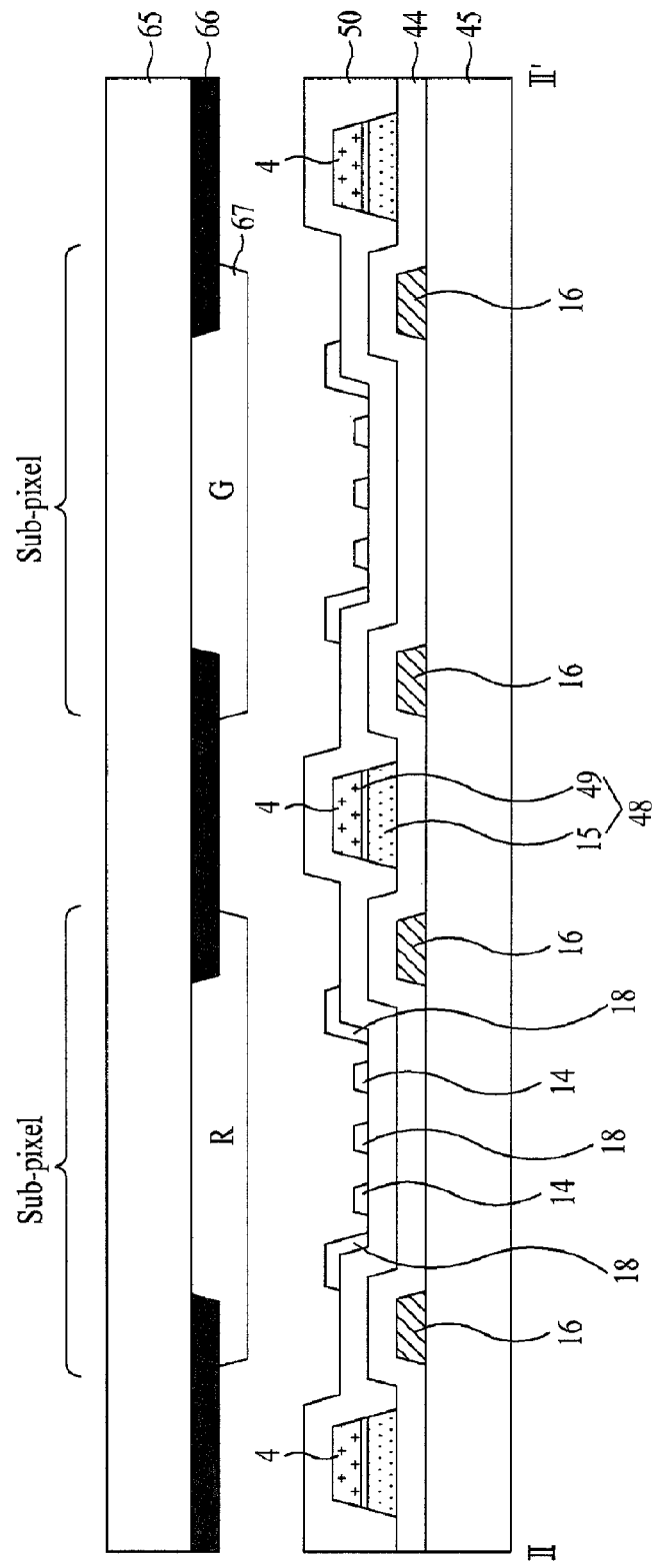
FIG. 1 is a perspective view of a conventional in-plane switching mode LCD.
Figure 15:
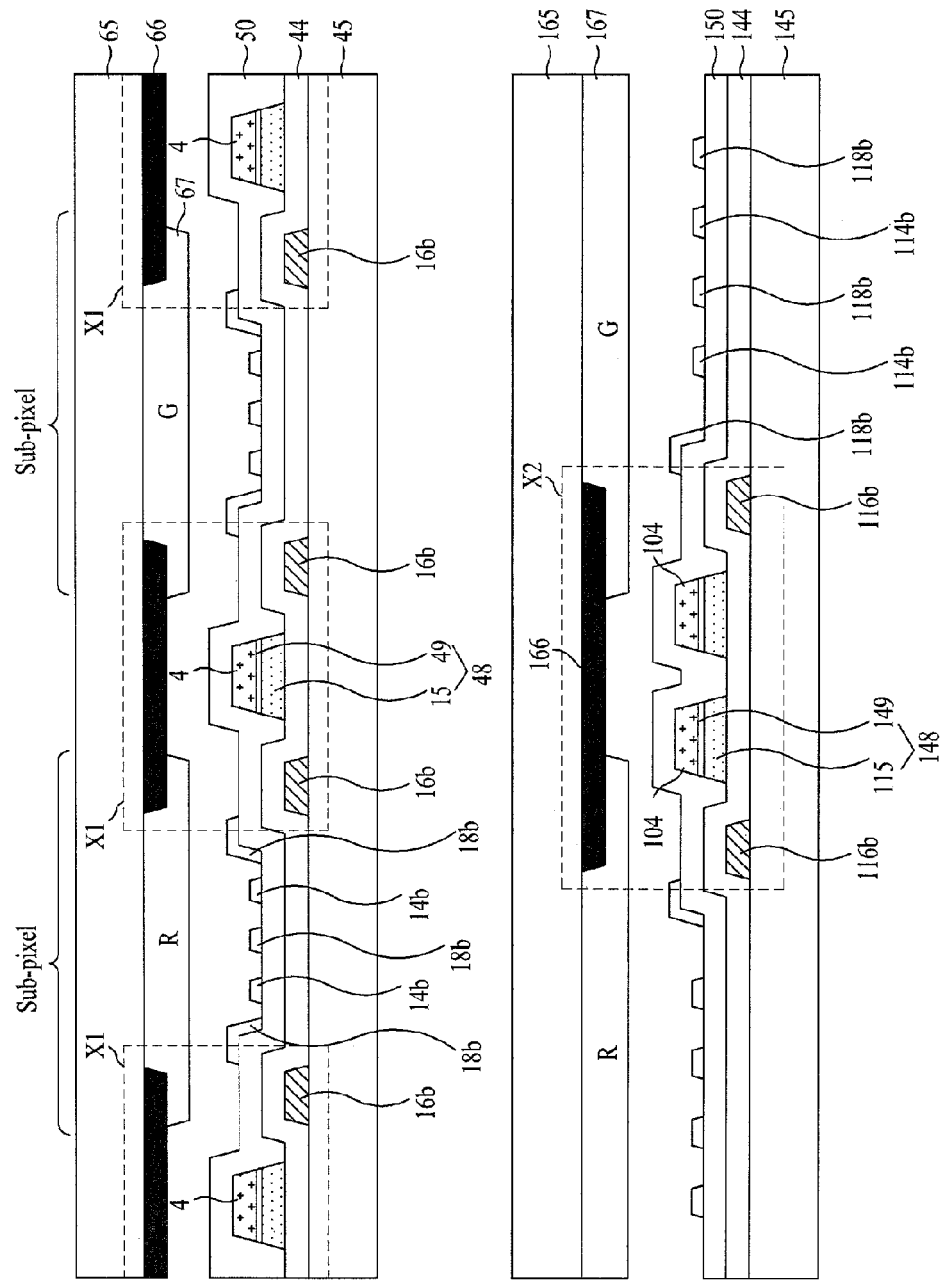
FIG. 15 is a cross-section view comparing the conventional structure according to FIG. 1 and the structure of the present invention according to FIG. 5 in the in-plane switching mode LCD.

FIG. 15 is a cross-section view comparing the conventional structure according to FIG. 1 and the structure of the present invention according to FIG. 5 in the in-plane switching mode LCD.

In FIG. 15, X1 is a region including a data line 14 and a second common line 16b to reduce aperture ratio in the conventional structure, and X2 is a region including a data line 104 and a second common line 116b to reduce aperture ratio in the structure of the present invention.

The below table 1 shows lines' width in one sub-pixel of X1, and the below table 2 shows lines' width in one sub-pixel of X2.

TABLE 1

| Line Width of A Data Line | 5.7 μM |
|---|---|
| Line Width of A Second Common Line × 2 | 8.0 μM × 2 = 16.0 μM |
| An Interval between the Second Common Line and A Data Line | 4.0 μM × 2 = 8.0 μM |
| A Margin of An Interval between Common Line | 3.5 μM × 2 = 7.0 |

TABLE 2

| Line Width of A Data Line | 5.7 μM |
|---|---|
| Line Width of A Second Common Line × 2 | 8.0 μM × 2 = 16.0 μM |
| An Interval between the Second Common Line and A Data Line | 4.0 μM × 2 = 8.0 μM |
| A Margin of An Interval between Common Line | 3.5 μM × 2 = 7.0 |

As shown in table 1, a sum of line width in X1 is about 36.7 μm and a sum of line width in X2 is about 52 μm.

However, there is only one X2 in two sub-pixels in the structure of the present invention, on the other hand there are two X1s in two sub-pixels in the conventional structure. As the result of that, 4 to 10 percent of total aperture ratio increases.

It will be apparent to those skilled in the art that various modifications and variations can be made in the present invention without departing from the spirit or scope of the invention. Thus, it is intended that the present invention cover the modifications and various of this invention provided they come within the scope of the appended claims and their equivalents.

What is claimed is:
1. An in-plane switching mode liquid crystal display device (LCD) formed of a plurality of pixels arranged in a matrix, comprising:

a gate line formed on a lower substrate;

a data line formed such that the data line intersects the gate line to define a pixel region;

a thin film transistor (TFT) formed at the intersection of the gate line and the data line;

a pixel electrode connected to the TFT;

a common line parallel to the gate line and formed in an upper portion of the pixel region;

a common electrode parallel to the pixel electrode such that the common electrode is branched from the common line and elongated to the pixel region;

a vertical common line formed parallel to the data line and connected to the common line; and a storage part elongated from the pixel electrode and partially overlapped with the vertical common line, wherein the data line comprises a pair of sub-lines facing directly with each other, and wherein the data line and the vertical common line are disposed alternatively between one pixel region.

2. The in-plane switching mode LCD of claim 1, wherein the common line and the gate line are formed of a same layer, and the vertical common line and the data line are formed of a same layer.

3. The in-plane switching mode LCD of claim 1, wherein the storage part is overlapped with an upper portion of the vertical common line in one sub-pixel of two neighboring sub-pixels in a horizontal direction, and the storage part is overlapped with a lower portion of the vertical common line in the other sub-pixel of the two neighboring sub-pixels.

4. The in-plane switching mode LCD of claim 1, wherein the common line is connected to the vertical common line electrically by a connection pattern covering a first contact hole formed to expose the common line and a second contact hole formed to expose the vertical common line spontaneously.

5. The in-plane switching mode LCD of claim 1, wherein the common line and the pixel electrode are formed of a same layer.

6. The in-plane switching mode LCD of claim 1, wherein the common line and the pixel electrode are formed of a transparent conducting material or an opaque metal layer.

\* \* \* \* \*